United States Patent [19]
Tysver

[11] Patent Number: 6,007,441
[45] Date of Patent: Dec. 28, 1999

[54] AUTOMATIC GEAR SHIFTING MECHANISM FOR MULTI-SPEED MANUALLY POWERED VEHICLES

[75] Inventor: Oliver J. Tysver, Flossmoor, Ill.

[73] Assignee: Oliver Design Corp., Chicago, Ill.

[21] Appl. No.: 09/149,244

[22] Filed: Sep. 8, 1998

[51] Int. Cl.⁶ .............................. F16H 9/00; F16H 59/00; F16H 7/22
[52] U.S. Cl. ................................ 474/70; 474/80; 474/102
[58] Field of Search .................................. 474/69, 70, 78, 474/79, 80, 81, 82, 13, 14, 109, 113, 102

[56] References Cited

U.S. PATENT DOCUMENTS

| | | | |
|---|---|---|---|
| 3,769,848 | 11/1973 | McGuire | 74/217 B |
| 4,185,510 | 1/1980 | Juy | 74/217 B |
| 4,346,772 | 8/1982 | Clifft | 180/11 |
| 4,352,503 | 10/1982 | Cotter | 280/238 |
| 4,352,504 | 10/1982 | Pianalto | 280/281 R |
| 4,571,219 | 2/1986 | Brenden et al. | 474/70 |
| 4,613,010 | 9/1986 | Enocson | 280/260 |
| 4,743,041 | 5/1988 | Vazin | 280/236 |
| 5,154,673 | 10/1992 | Fukunaga et al. | 474/13 |
| 5,163,881 | 11/1992 | Chattin | 474/78 |
| 5,295,916 | 3/1994 | Chattin | 474/78 |
| 5,445,567 | 8/1995 | Chattin | 474/78 |

OTHER PUBLICATIONS

Grossman, John; Shifting in Cycling is Brought up to Speed; *Sports Illustrated*, Jul. 25, 1988.
Zimmer, Carl; Easy Rider; p. 30; *Discover Magazine*; Aug., 1990.
Advertisement; The Main Sequence, 1814 Holland Drive, Walnut Creek, California. No Date.

Primary Examiner—Thomas R. Hannon
Assistant Examiner—Matthew A. Kaness
Attorney, Agent, or Firm—Knechtel, Demeur & Samlan

[57] ABSTRACT

An automatic gear shifting device for multi-speed bicycles. According to the invention, the device comprises a centrifugal force gear shifting mechanism which is controlled by the pedaling cadence of the rider. Pedal crankshaft speed is transferred to a main unit which contains an axially mounted drive shaft. Flyweights which are pivotally affixed to the drive shaft by an inner sleeve engage the housing thread members once a rider pedals outside of a predetermined cadence range. Engagement of the threaded members causes the inner sleeve to move one position. A cam follower affixed to the inner sleeve thereafter causes rotation of an outer ring, the outer ring having upshift and downshift cable attached to it. Movement of the cable causes rotation of a cable drum which is pivotally mounted to a derailleur. Movement of the cable ring drum causes the derailleur to shift gears. Also provided is a means to adjust the cadence range.

36 Claims, 4 Drawing Sheets

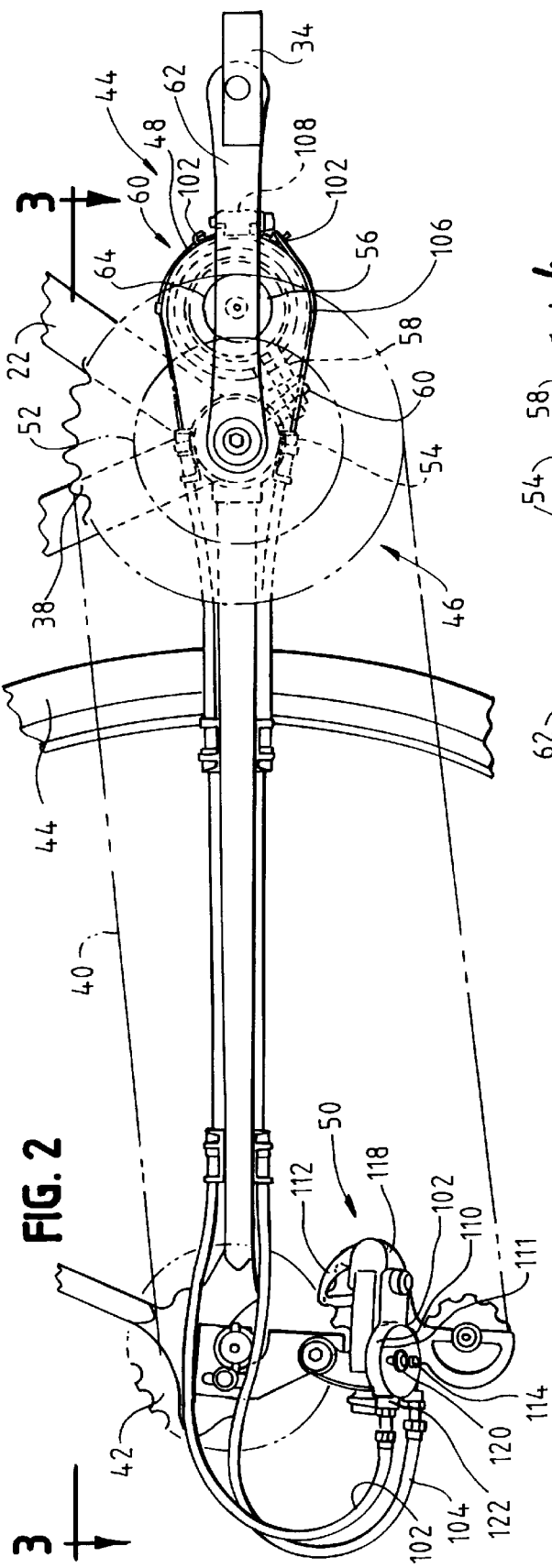
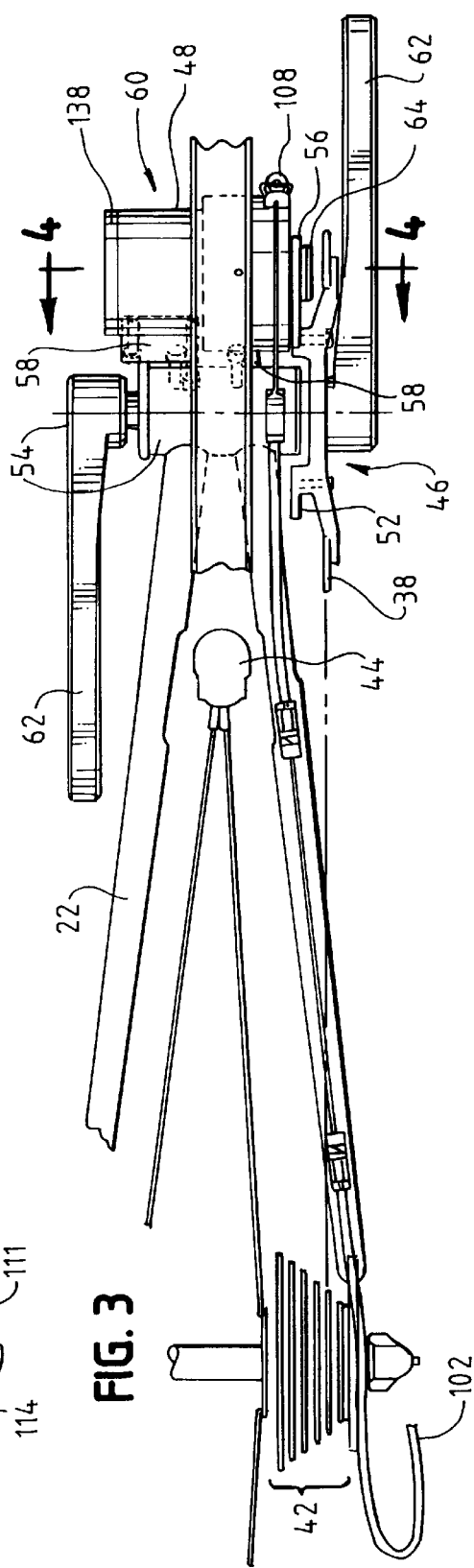
FIG. 2
FIG. 3

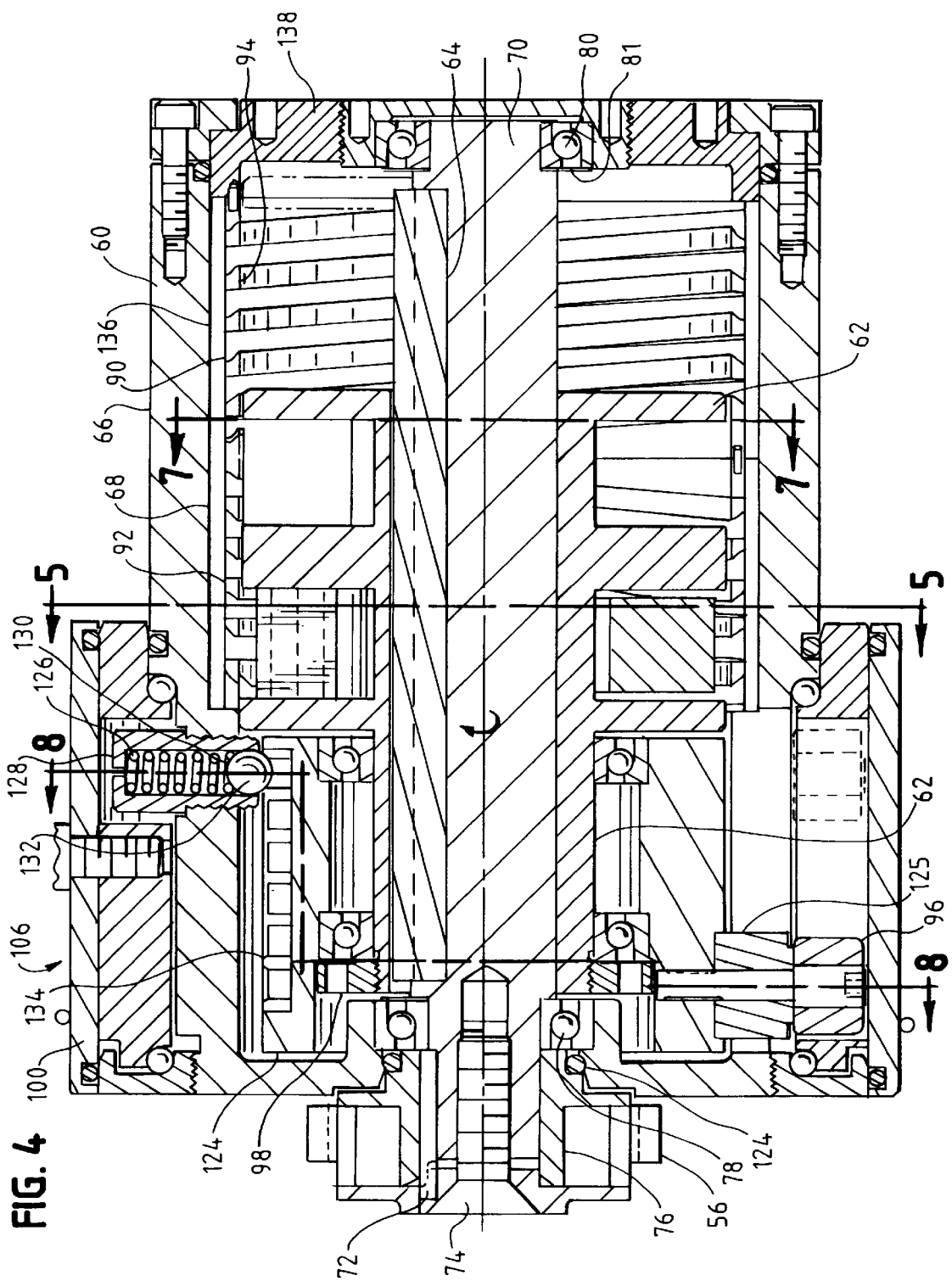

AUTOMATIC GEAR SHIFTING MECHANISM FOR MULTI-SPEED MANUALLY POWERED VEHICLES

I. FIELD OF THE INVENTION

The present invention relates to automatic gear shifting mechanisms for multi-speed manually powered vehicles. More particularly it relates to an automatic gear shifting mechanism for multi-speed bicycles wherein gear shifting occurs as a result of variations in centrifugal force created by the pedaling cadence of a rider outside of a predetermined cadence range change.

II. BACKGROUND OF THE INVENTION AND PRIOR ART

Bicycling is a popular activity having world wide appeal. Bicycles are used in a variety of settings including transportation, racing, (for example, road racing and mountain bike racing), and work environments (for example, delivery services and bicycle police patrols). The majority of bicycles, however, are used for recreational purposes. A 1991 study by NFO Research and reported in *American Demographics Magazine*, 1995, estimated that there were 33 million recreational bicycle riders in the United States. The survey classified those riders into four categories: enthusiasts, moving ups, casuals, and infrequents. The casuals and infrequents categories account for 90% of the riding population and 70% of bicycle industry revenues.

With wide use has come improved bicycle technology. Historically recent advances in bicycle technology have produced lighter and stronger bicycle frames, improved breaking systems, and improved propulsion systems. Propulsion system advances include the multi-speed gear system. While there are many variations of multi-gear systems for bicycles, the most common system includes, one, two, or three sprockets located adjacent to the pedaling crankshaft operationally connected via a chain to a multi-sprocket system located adjacent to the rear wheel hub. The rear wheel gear system also includes a derailleur. The derailleur connects via a shifting cable to a lever located on either the bicycle frame or bicycle handlebar. To change gears, i.e. adjust the chain from one sprocket to another sprocket, a rider manipulates the lever which causes the derailleur to move. Movement of the derailleur causes the chain to move from sprocket to sprocket. Each of the sprockets found on the rear wheel hub is of a different size. Thus, as the chain is selectively moved between the sprockets, the gear ratios are altered resulting in a change of gears. For instance, if the chain is moved to a larger sprocket, pedaling becomes easier, if moved to a smaller sprocket, pedaling becomes more difficult. An example of such a system is seen in U.S. Pat. No. 4,185,510 to Guy.

Multi-speed bicycles are very popular inasmuch as they make bicycles more versatile. However, gear shifting makes a bicycle more complicated, and can also lead to injury as a result of a rider diverting his attention from the roadway to the shifting mechanism during a bike shift. Support for these statements is found in the 1991 NFO Research study which noted that casual and infrequent riders avoid visiting bicycle shops as a result of the fear of being overwhelmed by technical talk, and that riders were looking for an uncomplicated way to ride a bicycle.

Even before the 1991 survey, advancements had been made in multi-gear bicycle systems. Among these advances are automatic gear shifting mechanisms. Automatic gear shifting mechanisms are designed to make bicycling more enjoyable and less dangerous by providing a means to take advantage of the multi-speed capabilities of a bicycle while, at the same time, reduce the complexity associated with the multi speed systems. Automatic gear shifting mechanisms rely upon either torque or centrifugal force. Representative prior art example of an automatic gear shift system relying on torque is seen in U.S. Pat. No. 3,769,848 to McGuire which teaches an automatic gear shifting mechanism for multi-speed bicycles consisting of a spring activated gear shift mechanism mounted near the rear wheel hub sprockets. Shifting occurs in response to increased torque applied to the wheel hub. Torque is created by the rider applying increased or decreased pressure to the pedals. As torque increases, the device shifts to a higher gear, and as torque decreases, it shifts to a lower gear. A shortcoming to torque reliant devices is that they require a rider to alter the amount of pressure applied to the pedals, the torque being transferred to the rear wheel in order to shift the rear wheels. Increasing the torque too drastically may cause the bike to shift more gears than is required, making bicycle pedaling more difficult than need be. Also, increased torque adds unneeded stress to the legs, particularly the knees and hips, which can lead to injury. When attempting to downshift, a rider may also experience multiple gear sprocket shifts if the amount of torque is decreased substantially. A further shortcoming of these devices is that when a rider "coasts" or does not pedal, the mechanism is placed in position for a downshift. This can cause downshifting followed almost immediately by upshifting when the rider resumes pedaling. Such movement is not only awkward but can also lead to injury.

A representative example of a centrifugal force type shifting mechanism is found in U.S. Pat. No. 4,352,504 to Cotter which teaches a speed sensitive automatic transmission for bicycles. The device includes a rotatable shaft connected to the rear wheel and having a plurality of outwardly extending arms fixed to the shaft. Each outwardly extending arm has a weight member slidably connected to it. As the speed of the tire either increases or decreases, the weights move along the plurality of outwardly extending arms. The movement of the weights causes an energy transfer via a cable to the rear wheel portion of the device which causes the gears to shift. A shortcoming of this device is that it is dependent upon the speed of the rear tire and not necessarily the speed the rider is pedaling. Thus, if a rider is traveling downhill and coasting, the tire is traveling at a high rate of speed while the rider is pedaling slowly or not at all. The device, however, will cause a shifting of the gears when it is either unnecessary to do so or will actually shift to an undesirable gear. For instance, if the tire is traveling at a high rate of speed, the device will shift to a higher sprocket. This may not be desirable in a situation when the rider will end a downhill run and immediately engage in an uphill run which requires a lower gear.

Another example of a centrifugal force type automatic bicycle transmission is seen in U.S. Pat. No. 4,571,219 to Bredan et al. which teaches an apparatus utilizing speed actuators which respond to the centrifugal force created by the rotating bicycle wheel. The speed actuators are attached to the sprockets of the rear wheel and, through a chain mechanism, attach to the gear shifting mechanism. This device also contains a master cylinder containing fluid and a piston. As the speed of the rear wheel increases or decreases, the actuators move along the chains, causing the fluid to move the piston, resulting in the shifting of gears. Similar to U.S. Pat. No. 4,352,503, this device suffers from the same shortcomings inasmuch as the gear shifting mechanism depends on the speed of the rear wheel as opposed to the speed with which a rider is pedaling.

Yet another example is seen in U.S. Pat. No. 4,743,014 to Vasin which teaches an automatically variable gear ratio drive. This device does not require rear wheel gear sprockets. Instead, a single chain or belt roller mechanism is attached to an axially mounted spring. As the speed of rear wheel bicycle increases, the spring compresses, causing the entire mechanism to move closer to the wheel hub. This, in turn, causes movement of a pulley mechanism mounted near the front crank shaft. This movement causes a tensioning of the chain, resulting in increased difficulty in pedal movement. Conversely, slower pedaling causing expansion of the spring resulting in less tension in the chain or belt and easier movement of the pedals. A shortcoming of this device is that it is not suitable for conventional multi-speed bicycles inasmuch as the rear wheel multi-sprocket system and derailleur are absent. A further shortcoming of this device is that it appears to require a specially modified frame which increases the cost of a bicycle.

Final examples of a centrifugal force type automatic transmission for multi-speed bicycles are seen in U.S. Pat. Nos. 5,163,881, 5,295,916, and 5,445,567, all to Chattin. These patents teach an automatic transmission for bicycles utilizing a centrifugal force mechanism for gear shifting. The mechanism consists of weights connected to a rotatable shaft positioned through a base member to the derailleur. A collar is pivotally connected to each weight in such a manner that, upon rotation of the shaft, movement of the weight results which, in turn, causes movement of the collar. The collar is operatively connected to linkage members of the derailleur, the linkage members causing the derailleur to move and a gear shift results. A shortcoming of this device is that the principle functional features of the device are exposed to the elements and are subject to damage or faulty shifting.

A further shortcoming of this device is that gear shifting is controlled by the centrifugal force created by the speed of the rear wheel and not the pedaling cadence of the rider. Thus, undesired or unnecessary gear changes can occur.

There is need, therefore, for an improved automatic gear shifting mechanism for multi-speed bicycles which shifts gears based upon the speed of the rider's pedaling cadence as opposed to the speed of the rear wheel or applied torque.

III. OBJECTS OF THE INVENTION

It is an object of the present invention to provide a rider pedaling cadence dependent automatic gear shifting mechanism for multi-speed bicycles which overcomes the shortcoming of the prior art.

One object of the present invention to provide such a device which can be an original equipment manufacturer's option or an after market product.

It is a further object of the present invention to provide such a shifting mechanism wherein gear shifting results from centrifugal force operated flyweights which engage threaded members located on a slidably mounted sleeve, movement of the sleeve causing rotation of an outer ring, the outer ring further having tensioning cables which are operatively connected to the derailleur.

It is another object of the present invention to provide such a shifting mechanism in which the pedaling cadence at which a gear shift occurs can be adjusted by altering the point in which the flyweights engage the threaded members.

It is yet another object of the present invention to provide such a shifting mechanism which reduces the likelihood of the mis-shifting of gears and injury.

It is yet another object of the present invention to provide such a shifting mechanism in which the major working features of the device are not exposed to the elements.

It is yet another object of the present invention to provide such a shifting mechanism in which means to prevent shifting drift are provided.

IV. SUMMARY OF THE INVENTION

The above objects of the present invention are provided for in an automatic gear shifting mechanism for multi-speed bicycles of the type having a multi-sprocket system mounted adjacent to the rear wheel, a derailleur for moving a chain between sprockets and lever/cable portion for selectively moving the derailleur. According to the invention, a crankshaft gear is rotatably mounted to the crankshaft near the pedals. A housing containing the internal features of the shifting mechanism is mounted adjacent to the crankshaft. In the preferred embodiment, an exposed first gear mounted to the housing meshingly engages with the crankshaft gear. The exposed housing gear in turn meshingly engages with a shaft gear. In an alternate embodiment, the housing is mounted at a point parallel to but away from the crankshaft; in this embodiment, the first gear is not required and the shaft gear is operatively connected to the crankshaft gear via a chain or a belt.

The shaft gear is affixed to a shaft which is axially mounted into the housing. Located near one end of the shaft are two pivotally mounted flyweights. Located between the housing and shaft is an inner sleeve which slidably fits within the housing. At the end of the inside of the housing near the flyweights are found thread members located on its inner surface along approximately 180° of the circumference of the housing. The thread members are of a size that they can reversibly engage the flyweights. Near the opposite end of the inner sleeve and in the outer surface is found an indent system comprising at least one spring tensioned ball mounted into the interior wall of the housing, the ball being tensioned against one of a plurality of indents found along the outer surface of the inner sleeve.

At the end of the inner sleeve near the indent system is a cam follower. Also found near the indent system end of the inner sleeve is an outer ring fixed to the inner sleeve. The outer ring further has a cable extending from it, the cable being affixed to the outer ring at two points, an upshift cable portion, and a downshift cable portion. The cable is connected to a drum located on a conventional derailleur system of a multi-speed bicycle.

In operation, as a bicyclist pedals and reaches a cadence outside of the preselected range for maintaining a single gear, one of the flyweights then rotatably pivots from its resting groove on the inner shaft and engage the threads of the inner sleeve. The flyweight pivots are mounted approximatley 90° apart from one another and designed such that only one flyweight will pivotally rotate about the shaft from its resting space at a time. Determination of which flywheel rotates is determined by the cadence of a rider; one flyweight pivots for an upshift and the other pivots for a downshift. The pivoting flyweight engages the threads of the inner housing, the inner sleeve being slidably mounted within the housing, slides along the interior of the housing. As the inner sleeve moves, the cam follower moves in a straight line along the axis of the inner shaft. Movement of the cam follower, which interacts with the outer ring which contains a helical groove, causes outer ring rotation in one direction. Rotation of the outer ring tensions one of the two cable portions attached to it, depending on whether an upshift or downshift is required. Movement results in rotation of the drum which, in turn, then causes derailleur movement near the rear wheel of the bicycle, resulting in the chain moving from one sprocket to another sprocket.

The indent system prevents shifting "drift" by holding the inner sleeve in place after a shift has occurred. Also provided is an adjustment means to alter the angle of attack of the threads of the inner sleeve. Altering the rotational location of the inner sleeve moves the thread members, thus, altering the point at which the flyweights engage the threads. Thus, the rider can customize the cadence point at which gear shifting occurs.

V. BRIEF DESCRIPTION OF THE DRAWINGS

FIG. 2 illustrates a side view closeup of the propulsion mechanism of a multi-speed bicycle, including the inventive device.

FIG. 3 illustrates a top view close-up of the propulsion mechanism of a multi-speed bicycle, including the inventive device.

FIG. 4 illustrates a cross-sectional view of the main unit of the inventive device.

VI. DETAILED DESCRIPTION OF THE PREFERRED EMBODIMENT

While the invention will be described in connection with a preferred embodiment, it should be understood that it is not intended to limit the invention to that embodiment. On the contrary, it is intended to cover all alternatives, modifications, and equivalents as may be included within the spirit and scope of the invention as defined by the appended Claims.

Figure 1:
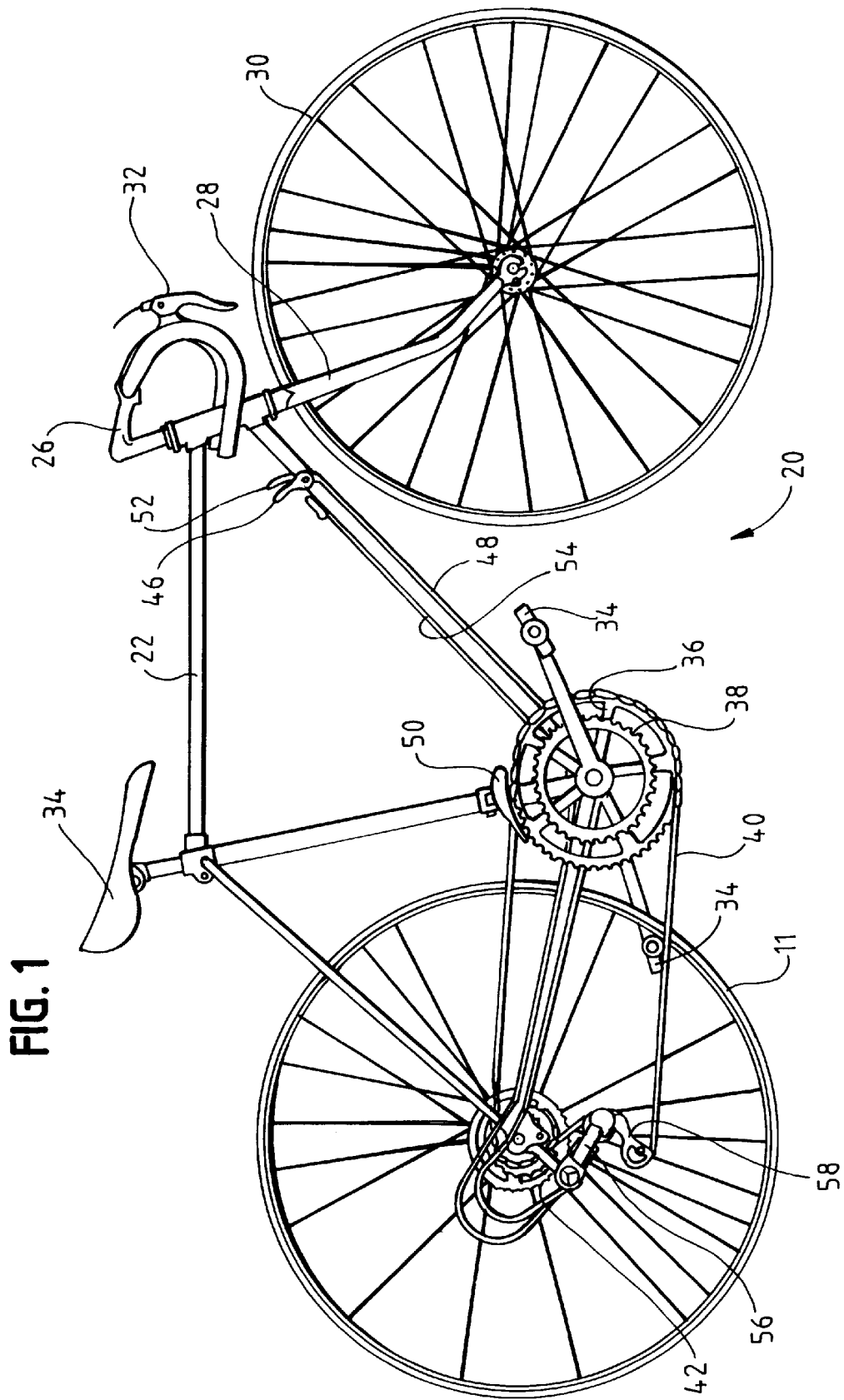
FIG. 1 illustrates a side view of a multi-speed bicycle.

Turning to FIG. 1, a side view of a typical multi-speed bicycle 20 is depicted. The basic features of a multi-speed bicycle include a frame 22, a seat 24, handle bars 26, handle bars 26 being directly attached to front fork 28, to which is attached a freely rotating front wheel 30. Most multi-speed bicycles use a hand brake 32 system for slowing down and stopping the bicycle. As with most bicycles, the typical multi-speed bicycle is propelled through manual leg power in which pedals 34 are rotated about a crankshaft (not seen) causing front sprockets, in the representative example depicted by FIG. 1 front sprockets 36, 38 to rotate, causing chain 40 to move. Chain 40 is operationally connected to rear sprocket unit 42 which is located on rear wheel 44 adjacent to the rear wheel axle (not seen).

Multi-speed bicycle shifting mechanisms typically include multiple sprockets (for example, first front sprocket 36 and second front sprocket 38) located near the crankshaft. Chain 40 is moved from front sprocket to front sprocket by manipulation of a front derailleur lever 46 which causes movement of front derailleur control cable 48, which, in turn, causes movement of front derailleur 50. Movement of front derailleur 50 causes chain 40 to move from sprocket to sprocket.

Chain 40 moves from sprocket to sprocket of rear sprocket unit 42 through the following sequence: rear derailleur lever 52 is manipulated in one direction or another causing movement of rear derailleur control cable 54. Movement of rear derailleur control cable 54 causes movement of rear derailleur 56, which, in turn, causes movement of chain 40 from sprocket to sprocket of rear sprocket unit 42. Also provided is a tension device 58 for maintaining appropriate chain tension as chain 40 moves from different diameter sprockets associated with rear sprocket unit 42.

Turning to FIGS. 2 and 3, it is seen that device 44 has three main components crankshaft sprocket member 46, main unit 48, and shifting unit 50. Crankshaft sprocket member 46 comprises a crankshaft gear 52 rotationally affixed to the longitudinal axis of crankshaft 54. Crankshaft gear 52 moves in unison with crankshaft 54 as it is rotated by the rider applying pressure to pedals 34. In the preferred embodiment, crankshaft gear 52 meshingly engages with drive shaft gear 56 of main unit 48. However, crankshaft gear 52 may be operationally connected to drive shaft gear 56 by means of a chain or belt (not depicted). Such a configuration would result if main unit 48 is not mounted to frame 22 as depicted in FIGS. 2 and 3. Main unit 48 can be mounted anywhere on frame 22 with the only restrictions being that it is mounted parallel to crankshaft 54 and does not interfere with the rider's operation of bicycle 20.

Main unit 48 is affixed to frame 22 by mounting bracket 58 and mounting bracket screw 60. As seen in FIG. 3, there are two mounting brackets 58 and mounting bracket screws 60, one at each end of main unit 48. While the preferred embodiment envisions such a mounting system, any conventional system can be used, such as strapping or welding. The only requirement is that the mounting system maintains main unit 48 in proper position during use of bicycle 20.

Turning to FIG. 4, a cross-sectional view of main unit 48 is depicted. Main unit 48 has three major subcomponents: housing 60, inner sleeve 62 and drive shaft 64. Housing 60 is an essentially cylindrical member having an exterior 66 and an interior 68. While the preferred embodiment envisions housing 60 as essentially cylindrical in shape, this is not critical. Any shape which provides a solid, economical housing is acceptable. The only requirement is that interior 68 should be of a complimentary shape to inner sleeve 62. Housing 60 must also be of a thickness to protect the internal workings from outside forces such as rocks, limbs, etc.

Inner sleeve 62 is slidably disposed within interior 68 of housing 60. Inner sleeve 62 is also an essentially cylindrical hollow member, although it may comprise any shape which enables it to slide through interior 68 of housing 60. Drive shaft 64 is axially mounted. Drive shaft 64 has a first end 70 and a second end 72. Drive shaft gear 56 is mounted to first end 70 and is secured by drive shaft gear screw 74. In the preferred embodiment, crankshaft gear 52 meshingly engages drive shaft gear 56 and free wheeling clutch 76 to ensure that drive shaft 64 rotates in the opposite direction as crankshaft 54. In an alternate embodiment wherein main unit 48 is not mounted adjacent to crankshaft 54, a belt or chain must be used to operationally engage main unit 48 with crankshaft gear 52. In such an embodiment, a second gear is not required so drive shaft 64 will be rotating in the appropriate direction. Drive shaft 64 is mounted in an axially stable position and freely rotates within and drives inner sleeve 62 about bearings 78, 80. It is secured into place by bearing housings 81 and 60. Clutch 76 enables a rider to pedal backwards without reversing the direction of drive shaft 64.

Figure 6:
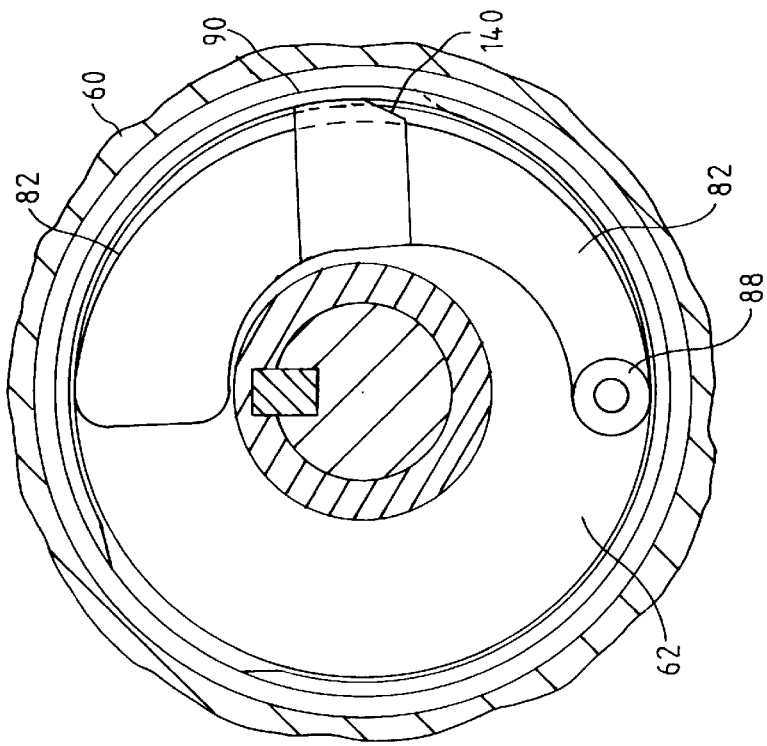
FIG. 6 illustrates an open end view of the main unit depicting the downshift flyweight mounted on the drive shaft.
Figure 5:
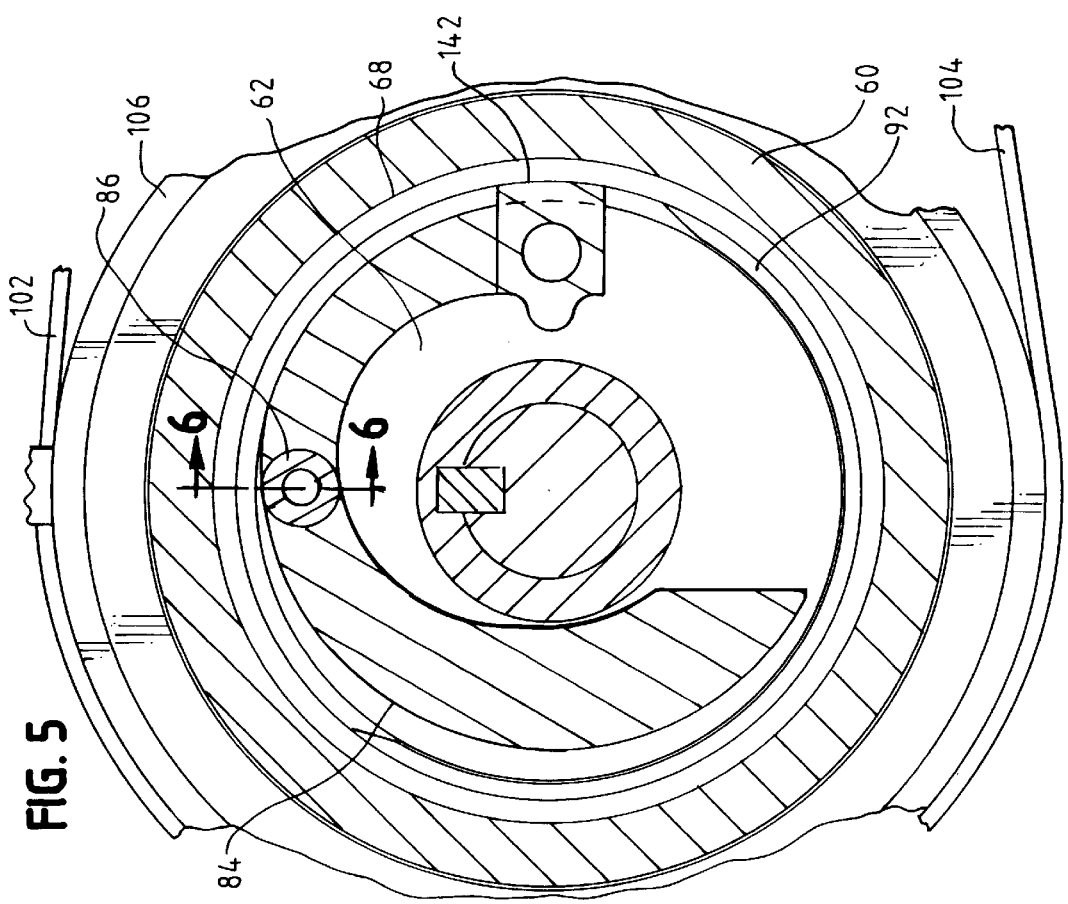
FIG. 5 illustrates an open end view of the main unit depicting the upshift flyweight mounted on the drive shaft.

FIGS. 5 and 6 show upshift flyweight 82 and downshift flyweight 84, pivotally attached to inner sleeve 62 flyweight pivot pins 86, 88, respectively. As more fully described below, rotation of shaft 64 causes one of the flyweights, depending on whether an upshift or downshift will occur, to pivot about pivot pin 86 or 88. Each flyweight includes a male thread member which engages the female thread of upshift cam thread member 90 for an upshift or downshift cam thread member 92, for a downshift. Thread members 90,92 have thread lead angles of between 20°–40°. The inventor has found that this lead angle range results in the smooth engagement of flyweight male thread member with female thread members. The flyweights contain male thread segments 140 for the upshift and 142 for the downshift. The location of the segments is 90° from the flyweight pivot for smooth operating engagement of the cam thread members 90 and 92. The flyweights are pivotally connected to sleeve 62 which is, in turn, connected to drive shaft 64. The cam thread segments are located in line to ensure flyweights will not simultaneously engage thread members.

Both threaded members are located on, and adjustably affixed to, the inner surface 68 of housing 60. As a flyweight engages a threaded member, inner sleeve 62 slides along the interior 68 of housing 60. Movement of inner sleeve 62 causes cam follower 96 which is attached to sleeve 124 and key 125 to slide along the axis of housing 60 in a straight line. Cam follower 96 operationally engages outer ring 100, rotationally affixed to the second end 146 of outer sleeve 60. As cam follower 96 engages outer ring 100, the outer ring rotates by means of a helical slot as the cam follower 96 moves along the axis of housing 60.

Outer ring 100 further contains upshift cable end 102 and downshift cable ends 102 affixed to its outer surface 106. The cable ends affix to the outer ring by means of adjustable cable clamps 108. Adjustable cable clamps 108 permit tension adjustment of the cable ends. As outer ring 100 rotates, either upshift cable end 102 or downshift cable end 102 will experience increased tension, depending on whether an upshift or a downshift in gears is required.

The tension is transferred to cable ring 110 (FIG. 2) via cable 102. Cable ring 110 and clamp 111 is pivotally affixed to derailleur 112 by means of a cable ring pivot pin 114. Cable 102 loops around the cable ring and is secured into a ridge (not shown) located along the outside edge 118 of a cable ring by a cable retainer 120 and cable stop guides 122. Cable ring 110 is mounted to derailleur 112 at such an angle that rotation of cable ring 110 causes derailleur 112 to move and shift the chain to a new sprocket position in the same manner as when manually shifted. The position of the derailleur can be adjusted by means of clamp 111.

Important to the function of the device is detent system 124 which comprises detent spring 126 disposed within detent spring chamber 128 of housing 60 interior 68. Located at exposed spring end 130 is detent ball 132. Detent ball 132 is sized to fit into detents 134 located adjacent to detent ball 132 and inserted into sleeve 124. There is one detent 134 associated with each gear of rear wheel sprocket unit 42. The number of detents can equal or exceed the number of individual sprockets of rear wheel sprocket unit 42. If the number of detents exceeds the number of sprockets, the excess number of detents will not be used. Thus, the Device is adaptable to bicycles having varying numbers of individual sprockets associated with rear wheel sprocket unit 42. Detent system 124 prevents shifting "drift". In other words, with the detent system, inner sleeve 62 movement will occur in a step-wise manner controlled by detent stops as opposed to free wheeling movement that results if no detents are employed.

In operation of a device, a rider propels bicycle 20 by applying pressure to pedals 34. This pressure causes crankshaft 54 to rotate about the horizontal axis, thereby driving front sprockets 36 and crankshaft sprocket member 46. Front sprocket 36 further drives chain 40 which causes rotation of rear wheel 44 by rotating rear sprocket unit 42.

Simultaneously, crankshaft sprocket member 46, which is meshingly engaged to drive shaft gear 56, causes drive shaft 64 to rotate about its horizontal axis. Rotation of drive shaft 64 must be in the opposite direction as crankshaft 54. The direction of drive shaft 64 is maintained in the opposite direction as the crankshaft through counter rotation caused by second drive shaft gear 56. If main unit 48 is not mounted adjacent to crankshaft 54, movement of drive shaft 64 is caused by a belt or chain which operationally connects crankshaft sprocket member 46 and drive shaft gear 56.

To maintain proper drive shaft rotation speed, the inventor has found that the optimal gear ratio between the crankshaft gear and the drive shaft gear is 3:1; although, ratio ranges from 2:1–4:1 are acceptable. Rotation of drive shaft 64 causes upshift flyweight 82 and downshift flyweight 84 to pivot about pivot pins 86, 88, respectively. So long as the rider maintains a pedaling cadence within a preselected range, the flyweights will not pivot about their axis enough to engage threaded members 90, 92. For instance, if the preselected cadence range is 40–70 revolutions per minute, the downshift flyweights will not engage the threaded member until a rider pedals slower than 40 revolutions per minute or the upshift flyweight will not engage until crankshaft turns faster than 70 revolutions per minute. The cadence range can be adjusted by manipulation of dial 138. Dial 138 can be turned by hand or, alternatively, dial 138 can be connected via a cable to a lever which can then be manipulated while the bicycle is in motion. When turning the dial clockwise, it engages and moves the upshift cam 90 and the downshift cam 92 to a higher rpm range before shifting occurs. Movement of the shift cams causes thread members 90, 92 to rotate about the inner housing 68. Conversely, rotating dial 138 counterclockwise moves upshift cam 90 and downshift cam 92 to a lower rpm range. While dial 138 can be located at any point along housing 60, manufacturing considerations dictate that the most efficient point is at the end of housing 60. As those skilled in the arts will appreciate, this configuration keeps machining to a minimum and dial 138 also acts as a housing end cap, thereby sealing the unit.

Alternatively, the upper and lower cadence ranges can be independently adjusted by dismantling the Device and altering the thread angle relationship with respect to one another.

Thread member 90, 92 optimally extend 180° of the circumference of inner surface 94; however, the range can be from 90° to 200°. The lower degree of thread member coverage, the faster gear shifting will occur. Conversely, the higher the degree of thread member coverage, the slower the gear shifting for a selected rpm range. The inventor has found that with thread members extending greater than 180°, gear shifting occurs too slowly to be of practical benefit inasmuch as the displacement is too narrow.

Flyweights 82, 84 are angled to engage threaded members 90, 92. Once a flyweight engages a thread member (the flyweight and appropriate thread member being determined by whether an upshift or downshift is required), it moves inner sleeve 62 over one position on detent system 124. The inventor discovered that due to the forces generated during a shift, that it is preferable to have two detent systems employed in the device which also balances the forces acting on the inner sleeve.

Movement of inner sleeve 62 causes straight line movement of cam follower 96, which, in turn, engages outer ring 100 which contains a helical cam follower path, causing outer ring 100 to rotate (rotating direction, again, is determined by whether an upshift or downshift will occur).

Rotation of outer ring 100 causes tension on one or the other end of upshift cable end 102. This tension is transferred to cable ring 110 via cable 102. Cable ring 110 then rotates, causing movement of derailleur 112, resulting in the derailleur moving the chain to a new sprocket position.

The inventive device further permits shifting of gears when it would not normally occur (i.e., when a rider is pedaling at a cadence within a preselected range) but is prudent. For instance, if a rider is traveling uphill but pedaling faster than 40 revolutions per minute, the device will cause a downshift due to the fact that the angle of the hill will change the lead angle of the cam thread and thus cause the downshift flyweight cam segment to engage the cam thread. The reverse scenario, involving the upshift flyweight, works in a downhill situation. Counter rotation of the drive shaft, while not critical to the operation of the device, does result in more responsive shifting in the uphill and downhill scenarios due to the fact that the counter rotation causes the flyweights to interact with the angular shift of the thread members which is not present on level surfaces.

As those skilled in the arts will understand, there are many variations or alterations of the device that can be made using the principles and devices discovered by the inventor. Therefore, the above description is not intended to be limiting but, instead, illustrative. Accordingly, it is the intention of the inventor to embrace all such variations and alterations as fall within the spirit and broad scope of the appended Claims.

I claim:

1. An automatic gear shifting mechanism for multi-speed bicycles comprising:
    a crankshaft gear perpendicularly mounted to a crankshaft, the crankshaft gear moving in unison with the crankshaft;
    a housing affixed adjacent to the crankshaft, the housing having an exterior portion, an interior portion, a first end, and a second end and further comprising a first gear which meshingly engages with the crankshaft gear and having thread members located along at least a portion of its inner surface;
    an inner sleeve slidably mounted in the interior portion of the housing, the inner sleeve being essentially hollow and further having an inner surface, an outer surface, a first sleeve end and a second sleeve end, the inner sleeve having a keyway;
    a shaft axially mounted in the inner sleeve, the shaft having a first end and a second end which drives the inner sleeve which is
    a first flyweight and a second flyweight, each flyweight being pivotally mounted to the inner sleeve, the shaft also being provided with a shaft gear which meshingly engages with the first gear of the crank;
    a cam follower mounted to the second sleeve end of the inner sleeve, the cam follower engaging a helical groove in the outer ring attached to the housing, the outer ring further being provided with a cable, the cable having an upshift end and a downshift end; and,
    a drum operatively connected to a derailleur, the drum being operatively connected to the cable;
    whereby as a rider pedals a bicycle at a speed outside of a preselected cadence range, the crankshaft gear causes the first gear of the housing to rotate at a speed which begins a gear shifting sequence, which, in turn, causes rotation of the shaft within the inner sleeve via the second gear, at an appropriate speed one or the other flyweight pivots about the shaft engaging the thread members of the housing causing the inner sleeve to slidably move about the interior portion of the housing, movement of the inner sleeve causing movement of the cam follower resulting in rotational movement of the outer ring, which, in turn, causes a tensioning of either the upshift end or downshift end of the cable, the tensioning causing movement of the derailleur.

2. The automatic gear shift mechanism of claim 1 wherein the thread members further comprise an upshift thread member portion and a downshift thread member portion.

3. The automatic gear shifting mechanism of claim 1 wherein the thread members of the inner housing extend about its inner surface circumference in a range of about 90° to about 200°.

4. The automatic gear shifting mechanism of claim 1 wherein the thread members of the inner sleeve extend 180° of the circumference of the inner surface of the inner housing.

5. The automatic gear shifting mechanism of claim 1 further comprising means for adjusting gear shifting cadence ranges.

6. The means for adjusting gear shifting cadence ranges of claim 5 further comprising a dial rotatably connected to the inner threaded sleeve, which, when rotated, causes rotation of the inner threaded sleeve, thereby altering the point at which the flyweights engage the thread members.

7. The means for adjusting shifting cadence ranges of claim 5 wherein the upshift thread members and the downshift thread members can be independently adjusted.

8. The means of preventing over movement and under movement of the inner sleeve of claim 7 wherein each indent is associated with a single sprocket of a multiple sprocket unit.

9. The automatic gear shifting mechanism of claim 1 further comprising at least one means for preventing over movement and under movement of the inner sleeve.

10. The means for preventing over movement and under movement of the inner sleeve of claim 9 further comprising a plurality of recesses located on at least a portion of the outer surface of the inner sleeve and means for engaging the indents located adjacent to the indents.

11. The means for preventing over movement and under movement of the inner sleeve of claim 10 wherein the means for engaging the indents comprises a spring member disposed within a chamber in the interior portion of the housing and a circular member located in cooperative relationship at one end of the spring member, the circular member being reversibly engaged with an indent.

12. The automatic gear shifting mechanism of claim 1 wherein the gear ratio between the crankshaft gear and the first gear of the housing is 3:1.

13. The automatic gear shifting mechanism of claim 1 wherein the gear ratio between the first gear of the crank and the second gear of the shaft is 2:1–4:1.

14. The automatic gear shifting mechanism of claim 1 wherein the first flyweight cam segment has a thread member lead angle of between 20°–40°.

15. The automatic gear shifting mechanism of claim 1 wherein the second flyweight cam segment has a thread member lead angle of 20°–40°.

16. The automatic gear shifting mechanism of claim 1 wherein the shaft spins in the opposite direction as the crankshaft.

17. The automatic gear shifting mechanism of claim 1 wherein the shaft spins in the opposite direction as the crankshaft.

18. An automatic gear shifting mechanism for multi-speed bicycles comprising:
- a crankshaft gear perpendicularly mounted to a crankshaft, the crankshaft gear moving in unison with the crankshaft;
- a housing mounted to a bicycle frame in the same plane as the crankshaft, the housing having an exterior portion, a first end, and a second end;
- an inner sleeve slidably mounted in the interior portion of the housing, the inner sleeve further having an outer surface, an inner surface, a first sleeve end and a second sleeve end, the inner sleeve further being a hollow member having a keyway;
- a shaft axially mounted into the interior of the inner sleeve, the shaft having a first end and a second end which drives the inner sleeve which is further provided with a first flyweight and a second flyweight, each flyweight being pivotally mounted to the inner sleeve, the shaft also being provided with a shaft gear;
- means to operatively engage the crankshaft gear and the shaft gear;
- a cam follower mounted near the second sleeve end of the inner sleeve, the cam follower engaging an a helical groove in the outer ring attached to the housing, the outer ring further being provided with a cable, the cable having an upshift end and a downshift end; and,
- a drum operatively connected to a derailleur, the drum being operatively connected to the cable;
- whereby as a rider pedals a bicycle at a speed outside of a preselected cadence range, the crankshaft gear causes rotation of the shaft gear via the means for operatively connecting the crankshaft gear and the shaft gear which, in turn, causes rotation of the shaft within the inner sleeve, at an appropriate speed a flyweight pivots about the inner sleeve engaging with the thread members of the inner housing, causing the inner sleeve to slidably move about the interior portion of the housing, movement of the inner sleeve causing movement of the cam follower resulting in rotational movement of the outer ring, which, in turn, cases a tensioning of one end of the cable, the tensioning causing rotation of the drum, the drum causing movement of the derailleur sprocket.

19. The automatic gear shifting mechanism of claim 18 wherein the means to operatively engage the gear crankshaft and the shaft gear is a housing gear.

20. The automatic gear shifting mechanism of claim 18 wherein the means to engage the crankshaft gear and the shaft gear is a chain.

21. The automatic gear shifting mechanism of claim 18 wherein the means to engage the crankshaft gear and the shaft gear is a belt or chain.

22. The automatic gear shift mechanism of claim 18 wherein the thread members further comprise an upshift thread member portion and a downshift thread member portion.

23. The automatic gear shifting mechanism of claim 18 wherein the thread members of the inner sleeve housing extend about its inner circumference in a range of about 90° to about 200°.

24. The automatic gear shifting mechanism of claim 18 wherein the thread members of the inner sleeve extend 180° of the circumference of the inner part of the inner sleeve.

25. The means for adjusting gear shifting cadence of claim 24 further comprising a dial rotatably connected to the inner sleeve, which, when rotated, causes rotation of the inner sleeve, thereby altering the point at which the flyweights engage the thread members.

26. The automatic gear shifting mechanism of claim 18 further comprising means for adjusting gear shifting cadence ranges.

27. The means for adjusting shifting cadence ranges of claim 26 wherein the upshift thread members and the downshift thread members can be independently adjusted.

28. The means for preventing over movement and under movement of the inner sleeve of claim 27 wherein the means for engaging the indents comprises a spring member disposed within a chamber in the interior portion of the housing and a circular member located in cooperative relationship at one end of the spring member, the circular member being reversibly engaged with an indent.

29. The means of preventing over movement and under movement of the inner sleeve of claim 27 wherein each indent is associated with a single sprocket of a multiple sprocket unit.

30. The means for preventing over movement and under movement of the inner sleeve of claim 26 further comprising a plurality of indents located on at least a portion of the outer surface of the inner sleeve and means for engaging the indents located adjacent to the indents.

31. The automatic gear shifting mechanism of claim 18 further comprising at least one means for preventing over movement and under movement of the inner sleeve.

32. The automatic gear shifting mechanism of claim 18 wherein the gear ratio between the crankshaft gear and the first gear of the housing is 3:1.

33. The automatic gear shifting mechanism of claim 18 wherein the gear ratio between the first gear of the housing and the second gear of the shaft is 2:1.

34. The automatic gear shifting mechanism of claim 18 wherein the first flyweight has a thread member lead angle of about 20–40° off vertical.

35. The automatic gear shifting mechanism of claim 18 wherein the second flyweight has a thread member lead angle of about 20–40° off vertical.

36. An automatic gear shifting mechanism for manually powered vehicles of the type having at least a frame, a steering member, at least two wheels, a crankshaft pedals rotatably mounted to the crankshaft, at least one crankshaft sprocket perpendicularly affixed to the crankshaft, a multiple sprocket unit affixed to one of the at least two wheels, a chain positioned to simultaneously engage one sprocket of the at least one crankshaft sprocket and one sprocket of the multiple sprocket gear unit, and means for shifting the chain from sprocket to sprocket of the multiple sprocket gear unit, comprising:
- a housing mounted to the manually powered vehicle in the same plane as the crankshaft, the housing further having an interior portion and an exterior portion, the interior portion further having an inner sleeve slidably inserted into its interior portion, the interior portion of the housing being further supplied with means for reversibly holding the inner sleeve into a selected position;
- the inner sleeve having opposing ends, an outer portion and an hollow inner portion, the outer portion being further provided with a plurality of recesses which engage the means for reversibly holding the inner sleeve into a selected position, the inner portion of the inner sleeve being further provided with means for enabling sliding movement of the inner sleeve, a shaft positioned in the hollow inner portion of the inner sleeve, the shaft and further comprising means for engaging the means for enabling sliding movement of the inner sleeve;

means for operationally engaging the crankshaft and the shaft;

means for selectively moving the means for shifting the chain from sprocket to sprocket; and, means for transferring a gear shifting signal from the inner sleeve to the means for selectively moving the means for shifting the chain.

* * * * *